(12) United States Patent
Moyer et al.

(10) Patent No.: US 7,278,062 B2
(45) Date of Patent: Oct. 2, 2007

(54) METHOD AND APPARATUS FOR RESPONDING TO ACCESS ERRORS IN A DATA PROCESSING SYSTEM

(75) Inventors: William C. Moyer, Dripping Springs, TX (US); Michael D. Fitzsimmons, Austin, TX (US); Brian M. Millar, Austin, TX (US); John J. Vaglica, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 619 days.

(21) Appl. No.: 10/339,022

(22) Filed: Jan. 9, 2003

(65) Prior Publication Data

US 2004/0139372 A1 Jul. 15, 2004

(51) Int. Cl.
*G06F 11/00* (2006.01)

(52) U.S. Cl. .............................. 714/43; 714/2; 714/56; 712/233; 710/260

(58) Field of Classification Search ............... 714/241, 714/234; 713/200; 726/2; 710/303, 304
See application file for complete search history.

(56) References Cited

U.S. PATENT DOCUMENTS

| | | | | |
|---|---|---|---|---|
| 4,519,032 A | * | 5/1985 | Mendell | 711/173 |
| 4,538,265 A | * | 8/1985 | Day et al. | 714/17 |
| 4,542,454 A | * | 9/1985 | Brcich et al. | 711/106 |
| 5,519,842 A | * | 5/1996 | Atallah et al. | 711/202 |
| 5,598,420 A | * | 1/1997 | Kaufman | 714/712 |
| 6,199,181 B1 | | 3/2001 | Rechef et al. | |
| 6,311,273 B1 | | 10/2001 | Helbig, Sr. et al. | |
| 6,412,081 B1 | * | 6/2002 | Koscal et al. | 714/34 |
| 6,631,463 B1 | * | 10/2003 | Floyd et al. | 712/227 |
| 6,802,027 B2 | * | 10/2004 | Buhr et al. | 714/35 |
| 6,820,146 B2 | * | 11/2004 | Cox | 710/74 |
| 6,859,671 B1 | * | 2/2005 | Brown | 700/56 |
| 6,976,158 B2 | * | 12/2005 | Catherwood et al. | 712/241 |
| 2002/0066041 A1 | * | 5/2002 | Lemke | 713/202 |
| 2002/0166113 A1 | * | 11/2002 | Stoodley | 717/140 |
| 2004/0128627 A1 | * | 7/2004 | Zayas | 716/1 |
| 2005/0081120 A1 | * | 4/2005 | Birzer et al. | 714/48 |
| 2005/0114616 A1 | * | 5/2005 | Tune et al. | 711/163 |

OTHER PUBLICATIONS

Tom Christiansen, Jon Orwant, Larry Wall, Programming Perl, 2000, O'Reilly, 3rd edition, p. 1092.*

* cited by examiner

*Primary Examiner*—Scott Baderman
*Assistant Examiner*—Loan Truong
(74) *Attorney, Agent, or Firm*—Joanna G. Chiu; Susan C. Hill

(57) ABSTRACT

In one embodiment, a data processing system (10) has a processor (14) coupled to a bus, where the data processing system (10) includes access error detection circuitry (26) and access error response circuitry (12), each coupled to the bus (58, 60). The access error detection circuitry detects an access error in the data processing system. The access error response circuitry initiates replacement of an existing value on the bus with a predetermined value when the access error has been detected, and continues to replace the existing value on the bus with the predetermined value when the access error has been detected and a persistent mode indicator has been asserted. The predetermined value may correspond to a predetermined instruction value (74) or a predetermined data value (76). In one embodiment, different values for the predetermined value may be used depending on the current operating mode of the data processing system.

23 Claims, 3 Drawing Sheets

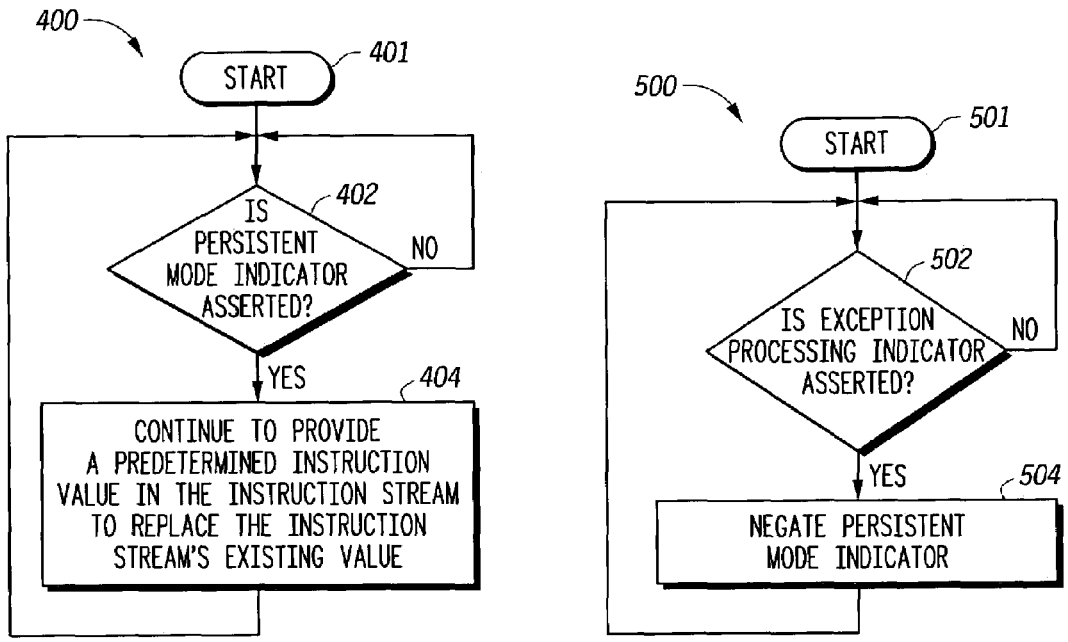
*FIG.4*   *FIG.5*
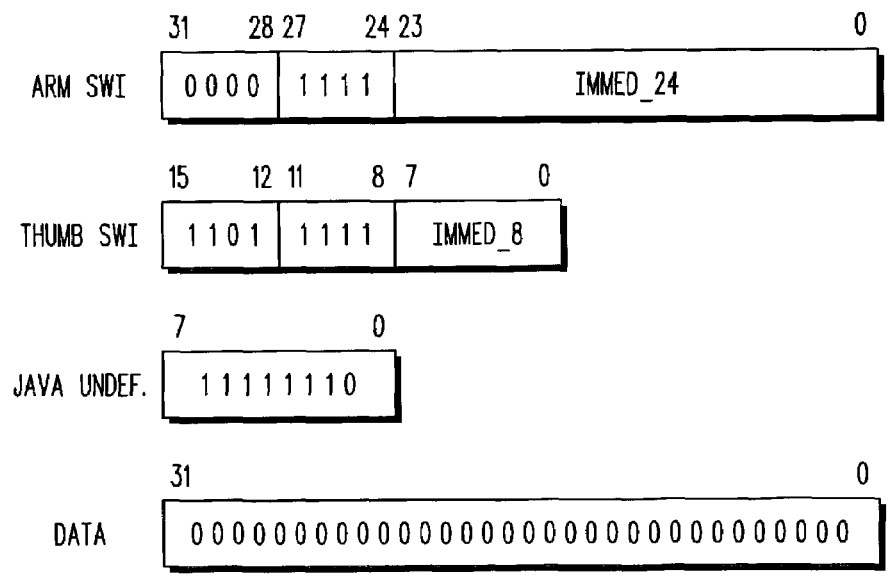
*FIG.6*

METHOD AND APPARATUS FOR RESPONDING TO ACCESS ERRORS IN A DATA PROCESSING SYSTEM

FIELD OF THE INVENTION

The present invention relates generally to data processing systems, and more specifically, to responding to access errors in a data processing system.

RELATED ART

Processors within a data processing system need to be protected from errors occurring within the data processing system. For example, an access error may be generated when security is violated by errant software running on the processor. Access errors may also be generated for a variety of other reasons and in a variety of ways by external circuitry coupled to the processor within the data processing system. However, some processors available today are not capable of responding to certain access errors at the termination of a bus access. For example, these processors may not be able to respond to certain access errors when the cache or write buffers are enabled. One example of such a processor is the ARM 926 (note that ARM is a trademark of ARM Ltd.). If a processor is unable to respond to access errors, the processor may not be able to adequately protect itself, thus possibly resulting in a malfunction or the corruption or giving away of secure data.

BRIEF DESCRIPTION OF THE DRAWINGS

The present invention is illustrated by way of example and not limited by the accompanying figures, in which like references indicate similar elements, and in which:

FIGS. 2-5 illustrate, in flow diagram form, methods used in responding to an access error, in accordance with one embodiment of the present invention; and FIG. 6 illustrates predetermined instruction and data values used in responding to an access error, in accordance with one embodiment of the present invention.

Figure 1:
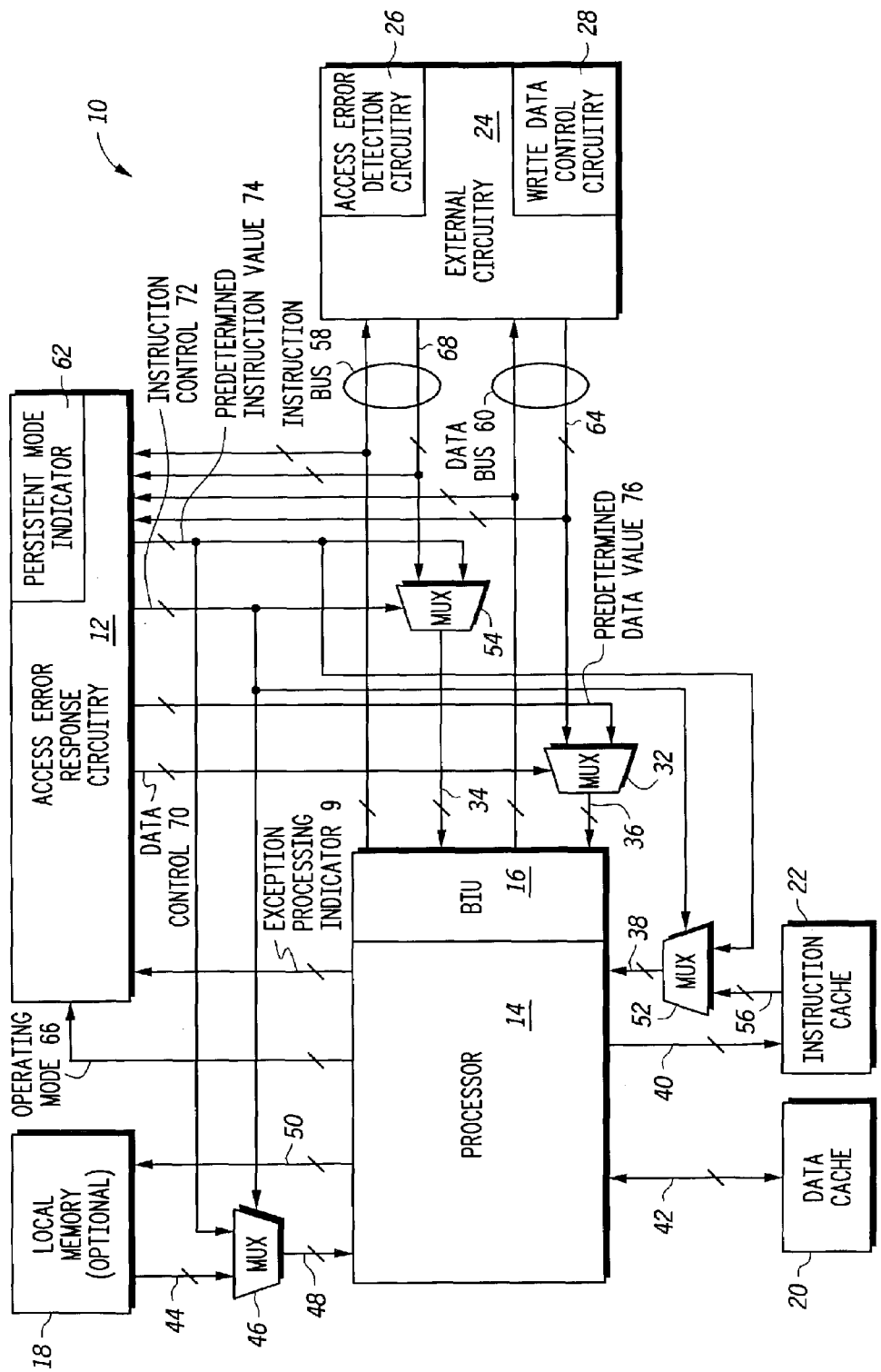
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

In order for a processor within a data processing system to better protect itself, the processor should be able to adequately respond to access errors. However, in some processors, such as in the ARM926 processor, the processor is unable to recognize certain external bus errors. For example, in this processor, external access errors are not recognized on cacheable loads and stores to memory. An external bus error which goes unrecognized may result in the corruption or breach of secure information within the processor or may result in the malfunction of the processor. Therefore, as will be described herein, access error response circuitry may be used to allow a processor to recognize and respond to access errors. Although the following description may be provided using the ARM926 processor as an example, the descriptions herein may apply to any processor having a variety of different architectures.

One embodiment of the present invention described herein relates to a data processing system having a processor coupled to the bus, where the data processing system includes access error detection circuitry and access error response circuitry, each coupled to the bus. The access error detection circuitry detects an access error in the data processing system. The access error response circuitry initiates replacement of an existing value on the bus with a predetermined value when the access error has been detected, and continues to replace the existing value on the bus with the predetermined value when the access error has been detected and a persistent mode indicator has been asserted.

An alternate embodiment of the present invention relates to a data processing system having a processor, an instruction bus, a data bus, and instruction cache coupled to the instruction bus, a data cache coupled to the data bus, access error detection circuitry coupled to the instruction and data buses, and access error response circuitry coupled to the instruction and data buses. The access error detection circuitry detects an access error in the data processing system. The access error response circuitry initiates replacement of an existing instruction value on the instruction bus with a predetermined instruction value when the access error has been detected and continues to replace the existing instruction value on the instruction bus with the predetermined instruction value when the access error has been detected and a persistent mode indicator has been asserted.

Yet another embodiment of the present invention relates to a method for responding to an access error in a data processing system. The method includes detecting an access error in the data processing system, determining which one of a plurality of modes is a current mode of the data processing system, and replacing an existing bus value with a predetermined value when the access error is detected. The predetermined value has a first value if the current mode of the data processing system is a first one of the plurality of modes and has a second value if the current mode of the data processing system is a second one of the plurality of modes. The first value and the second value are different values.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" and "negate" (or "deassert") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Connectivity

FIG. 1 illustrates, in block diagram form, a data processing system 10 in accordance with one embodiment of the present invention. Data processing system 10 includes a processor 14, a bus interface unit (BIU) 16, an optional local memory 18, a data cache 20, an instruction cache 22, access error response circuitry 12, external circuitry 24, multiplexers (MUXes) 46, 54, 32, and 52, instruction bus 58, and data bus 60. Processor 14 is coupled to instruction and data buses 58 and 60 via BIU 16 such that BIU 16 is coupled between processor 14 and instruction and data buses 58 and 60. (Note that the operation and coupling between processor 14 and BIU 16 and between BIU 16 and buses 58 and 60 are as known in the art and will not be discussed in more detail herein.) Processor 14 is coupled to optional local memory 18 (if present), data cache 20, and instruction cache 22. That is, processor 14 is capable of providing and receiving instructions to and from optional local memory 18 (via conductors 50 and conductors 44 and 48, respectively) and to and from instruction cache 22 (via conductors 40 and conductors 38 and 56, respectively). Processor 14 is also capable of providing and receiving data to and from data cache 20 via conductors 42. Processor 14 also provides an operating mode signal 66 and an exception processing indicator 9 to access error response circuitry 12. Access error response circuitry 12 includes a persistent mode indicator 62 which may be stored in a register or memory location within access error response circuitry 12 or elsewhere within data processing system 10.

BIU 16 provides instruction access information to external circuitry 24 on instruction bus 58 and is capable of receiving instructions from external circuitry 24 on instruction bus 58 (via conductors 68 and 34). BIU 16 provides data access information to external circuitry 24 on data bus 60 and is capable of receiving data from external circuitry 24 on data bus 60 (via conductors 64 and 36). MUX 54 has a first input coupled to receive instructions from external circuitry 24 via conductors 68, a second input coupled to receive a predetermined instruction value 74 from access error response circuitry 12, a control input to receive an instruction control signal 72 from access error response circuitry 12, and an output to provide either an instruction from external circuitry 24 or predetermined instruction value 74 to BIU 16 (and processor 14) via conductors 34 based on the value of instruction control signal 72. MUX 32 has a first input coupled to receive data from external circuitry 24 via conductors 64, a second input coupled to receive a predetermined data value 76 from access error response circuitry 12, a control input to receive a data control signal 70 from access error response circuitry 12, and an output to provide either data from external circuitry 24 or predetermined data value 76 to BIU 16 (and processor 14) via conductors 36 based on the value of data control signal 70. MUX 52 has a first input coupled to receive instructions from instruction cache 22 via conductors 56, a second input coupled to receive predetermined instruction value 74 from access error response circuitry 12, a control input coupled to receive instruction control signal 72 from access error response circuitry 12, and an output to provide either instructions from instruction cache 22 or predetermined instruction value 74 to processor 14 based on the value of instruction control signal 72. MUX 46 has a first input coupled to receive instructions from optional local memory 18 via conductors 44, a second input coupled to receive predetermined instruction value 74 from access error response circuitry 12, a control input coupled to receive instruction control signal 72 from access error response circuitry 12, and an output to provide either instructions from local memory 18 or predetermined instruction value 74 based on the value of instruction control signal 72.

In one embodiment of data processing system 10, processor 14 may be an ARM926 processor. However, alternate embodiments may have different processors as processor 14. In one embodiment, each of instruction bus 58 (which may also be referred to as the external instruction bus) and data bus 60 (which may also be referred to as the external data bus) is an Advanced High-Performance Bus (AHB). Also, although the instruction and data buses 58 and 60 coupled between BIU 16 and external circuitry 24 are illustrated as separate buses, such as in a harvard architecture AHB bus interface, alternate embodiments may use a single bus for both instruction and data or may multiplex the instruction and data buses such that a single bus is coupled to BIU 16. In the illustrated embodiment, optional local memory 18 is used to store instructions which may be used by processor 14. However, in alternate embodiments, if present, local memory 18 may be used to provide instructions and/or data to processor 14. (In one embodiment, local memory 18 is a tightly coupled memory, which may be, for example, a static random access memory (SRAM)). Also, processor 14 may have any number of local memories coupled to it, as needed. Each of the additional local memories could also have a multiplexer coupled between them and processor 14 which can be controlled by either instruction control signal 72 or data control signal 70. Data cache 20 and instruction cache 22 operate with processor 14 as known in the art and therefore, will only be described to the extent necessary to understand the embodiments discussed herein. Note that in one embodiment, instruction cache 22 may be a multi-way cache. In this embodiment, a MUX such as MUX 52 would be coupled to each way of the multi-way cache where each MUX would be able to provide either instructions from the corresponding way of the cache or predetermined instruction value 74 to processor 14 based on the value of the instruction control which may be used to control the MUXes. (Similarly, the data cache 20 may also be a multi-way cache.) Also, in an alternate embodiment, the data and instruction caches may be combined into a single cache (which may also be a multi-way cache). Also, in yet other embodiments, caches may not be present, or only a single instruction or data cache may be present.

External circuitry 24 may include an external memory (or memories), peripheral devices, input/output devices, etc. (Note that these are not shown in FIG. 1.) That is, data processing system 10 may include devices as needed within external circuitry 24. External circuitry 24 also includes access error detection circuitry 26 and write data control circuitry 28.

Note that data processing system 10 may be used in a variety of electronic devices. For example, data processing system 10 may be included in a handheld electronic device such as a wireless handheld device.

Operation

An access error can occur with either an instruction or a data access on the instruction or data bus (58 or 68) of FIG. 1. For example, an access error can include any type of bus error. This access error can occur if, for example, a secure area of memory is attempted to be accessed within external circuitry 24 or if an illegal access is attempted to a device within external circuitry 24. For example, as illustrated in FIG. 1, external circuitry 24 includes access error detection circuitry 26 which may be used to detect the occurrence of an access error. In one embodiment, access error detection circuitry 26 provides an access error (or bus error) indicator via the instruction or data bus which is then monitored by access error response circuitry 12. In an alternate embodiment, access error detection circuitry 26 may provide a signal directly to access error response circuitry 12 to indicate an access error. In yet another embodiment, access error detection circuitry 26 may provide any other type of indication either directly or indirectly to access error response circuitry 12. Also, although access error detection circuitry 26 is illustrated as a single box in FIG. 1, note that the access error detection circuitry may be distributed within external circuitry 24. For example, each device (not shown) within external circuitry 24 may have its own corresponding error access detection circuitry, as needed. That is, a memory device (not shown) may have access error detection circuitry to detect when an access to secure portions is attempted. Also, each peripheral device (not shown) may have corresponding access error detection circuitry to detect various error conditions, as needed. Also note that in alternate embodiments, other memories or devices, such as optional local memory 18 (or other internal memories), may have access error detection circuitry if access errors to those memories or devices are also to be monitored by access error response circuitry 12. Therefore, portions of access error detection circuitry 26 may also be located outside external circuitry 24.

In operation, access error response circuitry 12 may be used to replace existing values in a data and/or instruction stream with predetermined data or instruction values, respectively, upon receiving indication that an access error occurred. As described above, this access error indication can be provided in a variety of different ways by access error detection circuitry 26. For example, in the illustrated embodiment, access error response circuitry 12 is coupled to and monitors the instruction and data buses (58 and 60) for an access error indication provided by access error detection circuitry 26. Access error response circuitry 12 is therefore able to detect and respond to the occurrence of an access error. (Note that in this embodiment, access error response circuitry 26 detects and responds to those access errors caused by fetches which resulted from a cache miss or a non-cacheable access.) In response to an access error, access error response circuitry 12 provides a predetermined instruction or data value (74 or 76, respectively) to replace existing values in the instruction or data stream, respectively, to help ensure that processor 14 responds to the access error. For example, as will be described in more detail below in reference to FIGS. 2-5, when there is an instruction fetch on instruction bus 58 with an access error (detected by access error detection circuitry 26), access error response circuitry 12 can provide predetermined instruction value 74 to replace an instruction stream's existing value.

When there is a data access corresponding to a read access on data bus 60 with an access error, access error response circuitry 12 can provide predetermined data value 76 to replace a data stream's existing value in addition to providing predetermined instruction value 74 to replace an instruction stream's existing value. Also, when there is a data access corresponding to a write access on data bus 60 with an access error, the write access may be blocked in addition to, providing predetermined instruction value 74 to replace an instructions stream's existing value. In this case, the write access may be blocked by write data control circuitry 28 within external circuitry 24 where write data control circuitry 28 can prevent a write access to any particular device within external circuitry 24. Therefore, note that when an access error occurs in relation to a data access, the instruction stream's existing value is also replaced with predetermined instruction value 74 in order to prevent subsequent instructions from causing an error or using erroneous data.

Furthermore, after access error response circuitry 12 replaces the instruction stream's existing value with predetermined instruction value 74, access error response circuitry 12 enters a persistent mode (i.e. persistent mode indicator 62 is asserted) to ensure that processor 14 responds to the access error. During persistent mode, access error response circuitry 12 continues to replace the existing value on instruction bus 58 with predetermined instruction value 74 until the persistent mode indicator 62 is cleared. In one embodiment, as will be described in more detail below, the persistent mode indicator 62 is cleared when exception processing indicator 9 is asserted, indicating that exception processing has commenced.

In one embodiment, the predetermined data or instruction value (76 or 74) that is used to replace the existing values may be dependent on the current operating mode of processor 14 (as indicated to access error response circuitry 12 by operating mode signal 66). For example, in a normal operating mode, a mode-dependent software interrupt instruction (SWI) may be provided into the instruction stream (as predetermined instruction value 74) at all potential fetch points (for example, those points indicated by the outputs of MUXes 30, 52, and 46 of FIG. 1). Providing this SWI instruction as predetermined instruction value 74 at the potential fetch points can ensure that an SWI (which, in the current embodiment, is assumed to be non maskable) will be taken when an access error occurs. Furthermore, providing this SWI at the potential fetch points can ensure that any subsequent instruction after a data access will also generate an exception. In one embodiment, MUXes are used at all the potential fetch points because it may not be possible to know if the subsequent instruction will come from cacheable or non-cacheable space. Also, using the MUXes as shown in FIG. 1 prevents the need to modify the instruction stream directly, which is not always possible. Also, as discussed above, in order to ensure that the access error is not ignored, persistent mode is entered where the existing values in the instruction stream are continuously replaced with predetermined instruction value 74. Upon entering exception processing for the SWI (e.g. upon detecting the SWI vector fetch), persistent mode can be exited (i.e. persistent mode indicator 62 is negated) such that MUXes 54, 52, and 46 no longer replace the instructions in the corresponding instruction stream with the predetermined value, but instead allow exception processing to proceed normally.

In another operating mode of processor 14, a different value for predetermined instruction value 74 may be provided into the instruction stream. For example, processor 14 may be able to operate in a Java byte-mode in addition to a normal operating mode. (Note that Java is a trademark of Sun Microsystems.) In one embodiment of the Java byte-mode, there is no equivalent SWI instruction. Therefore, predetermined instruction value 74 may correspond to an undefined Java bytecode rather than to an SWI instruction. This will instead cause processor 14 to take a prefetch exception. Again, as with the normal operating mode, persistent mode is entered which ensures that the access error is not ignored. Upon entering exception processing for the prefetch exception (e.g. upon detecting the prefetch vector fetch), persistent mode can be exited such that MUXes 54, 52, and 46 no longer replace the instructions in the corresponding instruction stream with the predetermined instruction value.

Also note that when operating in normal mode, some embodiments may allow for operation in either big endian or little endian mode. Therefore, the predetermined instruction or data values may also be dependent upon an endian mode indicator (not shown in FIG. 1). That is, the predetermined instruction or data values may have a selectable bit-ordering based whether big or little endian mode is used.

FIG. 6 provides example values for predetermined instruction and data values (74 and 76) if the ARM926 processor is used as processor 14. That is, as described above, depending on the current operating mode of processor 14 (indicated by operating mode signal 66 to access error response circuitry 12), access error response circuitry 12 may use different values for the predetermined instruction and data values. For example, the ARM926 processor has three operating modes: normal ARM instruction mode (32-bit fixed length instructions); Thumb operating mode (16-bit fixed length instructions); and Java operating mode (8-bit java bytecode and a variable length bytecode extensions). (Note that Thumb is a trademark of ARM Ltd.) If operating mode signal 66 indicates the normal ARM instruction mode, then the ARM SWI instruction may be provided as predetermined instruction value 74, as illustrated in FIG. 6. If operating mode signal 66 indicates the Thumb operating mode, then the THUMB SWI instruction may be provided as predetermined instruction value 74, as illustrated in FIG. 6. Similarly, if operating mode signal 66 indicates the Java operating mode, then an undefined Java bytecode, as illustrated in FIG. 6, may be provided as predetermined instruction value 74. FIG. 6 also indicates that all zeros may be provided as predetermined data value 76 (when an access error occurs with a data fetch). However, the values provided in FIG. 6 are only examples, and alternate embodiments may use other opcode or data values as necessary. For example, other data values (such as, for example, all ones, or a predetermined pattern of ones and zeros) may be used, and other instructions, other than an SWI instruction may be used. For example, in one embodiment, a jump instruction may be used. (Therefore, note that depending on the value used for predetermined instruction value 74, different exception processing software routines may be executed within data processing system 10). Also, the various values used for predetermined instruction value 74 and predetermined data value 76 may be stored in a memory location within access error response circuitry 12 or elsewhere within data processing system 10.

Figure 2:
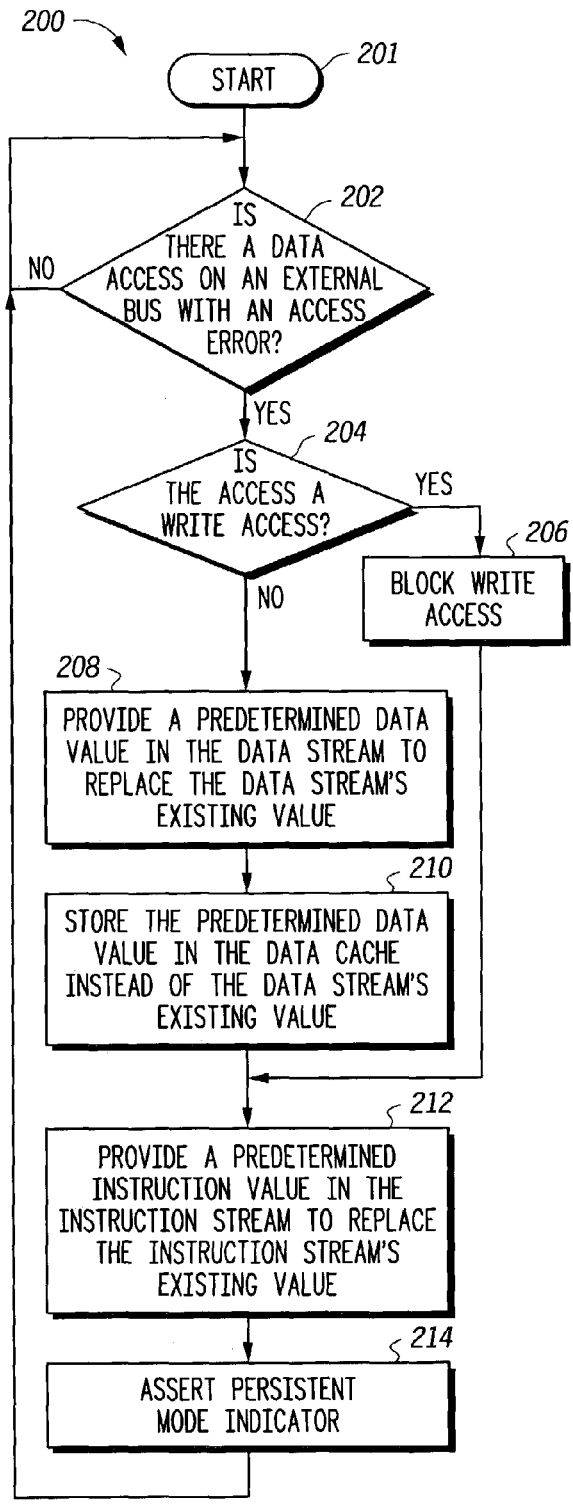
Figure 3:
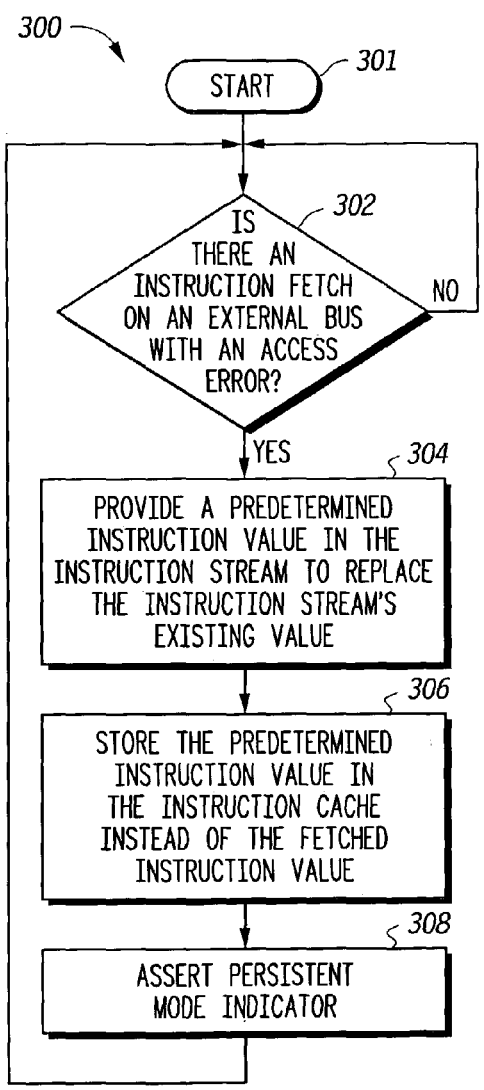

Operation of FIG. 1 can be better understood in reference to flow diagrams of FIGS. 2-5, respectively. FIG. 2 illustrates a flow 200 corresponding to a data access with an access error, FIGS. 3 illustrates a flow 300 corresponding to an instruction fetch-with an access error, FIG. 4 illustrates a flow 400 corresponding to operation of persistent mode, and FIG. 5 illustrates a flow 500 corresponding to exiting persistent mode. Note that each of flows 200, 300, 400, 500 may operate concurrently. Referring first to FIG. 2, flow 200 begins at start 201 and proceeds to decision diamond 202 where it is determined whether there is a data access on an external bus (e.g. data bus 60 of FIG. 1) with an access error. If not, flow returns to start 201. If so, flow proceeds to decision diamond 204 where it is determined whether the data access is a write access. If so, flow proceeds to block 206 where the write access is blocked. That is, as described above, write data control circuitry 28 is able to block write accesses to the target of the write. Flow then proceeds to block 212 where access error response circuitry 12 provides predetermined instruction value 74 in the instruction stream to replace the instruction stream's existing value. That is, in the illustrated embodiment, access error response circuitry 12 sets instruction control signal 72 so as to allow predetermined instruction value 74 to be provided via MUXes 54, 52, and 46 to processor 14 rather than the instruction stream's existing value. From block 212, flow proceeds to block 214 where persistent mode indicator 62 is asserted. Flow then returns to start 201.

Referring again to decision diamond 204, if the data access is not a write access (thus indicating a read access), flow proceeds to block 208 where access error response circuitry 12 provides predetermined data value 76 in the data stream to replace the data stream's existing value. That is, in the illustrated embodiment, access error response circuitry 12 sets data control signal 70 so as to allow predetermined data value 76 to be provided via MUX 32 to processor 14 rather than the data stream's existing value. Flow then proceeds to block 210 where, due to operation of processor 14, predetermined data value 76 is stored in data cache 20 rather than the data stream's existing value (which was replaced with predetermined data value 76). That is, since processor 14 generally stores the results of a data fetch read access to cache, predetermined data value 76 gets stored to data cache 20. Flow then proceeds to block 212 as described above.

Note that in block 214, persistent mode is entered. However, even during persistent mode, decision diamond 202 continues to monitor whether a data access on the external data bus with an access error occurs. If one occurs, then flow enters decision diamond 204 and either block 206 or blocks 208 and 210, as described above. However, if still in persistent mode, block 212 is already being taken care of due to the persistent mode which is continuously providing predetermined instruction value 74 in the instruction stream to replace the instruction stream's existing value until persistent mode is exited.

Referring to FIG. 3, flow 300 begins with start 301 and proceeds to decision diamond 302 where it is determined whether there is an instruction fetch on an external bus (e.g. instruction bus 58 of FIG. 1) with an access error. If not, flow returns to start 301. If so, flow proceeds to block 304 where access error response circuitry 12 provides predetermined instruction value 74 in the instruction stream to replace the instruction stream's existing value. Flow then proceeds to block 306 wherein predetermined instruction value 74 in the instructions stream is stored in instruction cache 22 rather than the fetched instruction value (which was replaced with predetermined instruction value 74). That is, since processor 14 generally stores the results of a cacheable instruction fetch to cache, predetermined instruction value 74 gets stored to instruction cache 22. Flow then proceeds to block 308 where persistent mode indicator 62 is asserted. Flow then returns to start 301. Note that as with flow 200, in flow 300, if already in persistent mode, then blocks 304 and 306 are already occurring due to the persistent mode which continuously provides predetermined instruction value 74 in the instruction stream to replace the instruction stream's existing value until persistent mode is exited. Note also that flow 200 and flow 300 can operate concurrently. Also, it is possible to have both a data fetch with an access error and an instruction fetch with an access error, in which case, flows 200 and 300 would occur in parallel.

Referring to FIG. 4, flow 400 begins with start 401 and proceeds to decision diamond 402 where it is determined whether persistent mode indicator 62 is asserted. If not, flow simply returns to start 401. If so, then flow proceeds to block 404 where predetermined instruction value 74 is continuously provided to replace the instruction stream's existing value. Flow then returns to start 401. Therefore, as can be seen in FIG. 4, access error response circuitry 12 will continuously provide predetermined instruction value 74 via MUXes 54, 52, and 46 so long as persistent mode indicator 62 is asserted.

Referring to FIG. 5, flow 500 begins with start 501 and proceeds to decision diamond 502 where it is determined whether exception processing indicator 9 is asserted. If not, flow simply returns to start 501. If so, flow proceeds to block 504 where persistent mode indicator 62 is negated. Flow then returns to start 501. As described above, exception processing indicator 9 can be any type of indication that processor 14 has at least begun responding to an access error. For example, as described above, in one embodiment, detection of the SWI vector fetch can be used to provide this exception processing indicator. Alternatively, detection of other vector fetches may be used. In other embodiments, other ways of generating exception processing indicator 9 may be used. Also, note that flows 400 and 500 may operate concurrently with each other and with flows 200 and 300. In the current embodiment, exception processing indicator 9 allows for the persistent mode indicator to be negated, thereby exiting persistent mode (which allows data processing system 10 to continue operation). However, in an alternate embodiment, flow 500 is optional. For example, in this alternate embodiment, once persistent mode is entered, it is not exited. In this case, access error response circuitry 12 may continue to provide predetermined instruction value 74 instead of the instruction stream's existing value until data processing system 10 shuts down, thus requiring a reset to be operational again.

Therefore, as can be seen from flows 200, 300, 400, and 500, access error response circuitry 12, upon detection of an access error, initiates a replacement of the instruction stream's existing value with predetermined instruction value 74. Access error response circuitry 12 then enters a persistent mode in which it continuously replaces the instruction stream's existing value with predetermined instruction value 74 until exception processing indicator 9 is asserted (thus exiting persistent mode). Access error response circuitry 12 is also able to replace a data stream's existing value with predetermined data value 76, as needed. Note also that an access error may be detected during a burst access. In this case, flows 200 and 300 may occur during a burst access and persistent mode may be entered or exited during the burst access.

Also, as described above, access error detection circuitry 26 can detect an access error due to many different conditions. Access error response circuitry 12 may therefore be used to respond to any type of access error that access error detection circuitry 26 is designed to detect or that other circuitry other than access error detection circuitry 26 may detect. For example, in one embodiment, an access error may be detected by a bus watchdog monitor. That is, data processing system 10 may include a bus watchdog monitor to terminate any bus cycles that are not terminated by any slaves in order to prevent data processing system 10 from being completely hung if software contains access to unimplemented space, or if a hardware error exists such that a peripheral cannot terminate the cycle properly.

In another embodiment, information can be prevented from being cached for later use (because, once information is cached, it lacks visibility to the external bus). For example, secure ROM code, secure RAM space, and any other sensitive memory areas or peripherals may be marked as non-cacheable in the memory management unit's (not shown) page table for that region. However, from a security point of view, the applications processor can be determined to be "limited trust" in supervisor mode. If the page tables can be modified in this supervisor mode, sensitive regions can be changed to cacheable. Therefore, these sensitive areas can be prevented from being cached by monitoring bits to determine if a cache line fill is in progress. If so, an access error can be generated so that access error response circuitry 12 can zero out data bus 60 so as not to display sensitive data on the bus.

In another embodiment, an access error can be generated in response to an access to unauthorized locations in an external shared memory system. For example, in a multi-processor system, such as a wireless device, there may be one external memory subsystem that can be shared by the call and applications processor in the device. Both processors can have a shared region in external space that either processor can access. Also, both processors can have a private region in external space that should not be accessed by the other processor. For example, if the applications processor can access the call processor's private space, it could gain knowledge and trash or modify the call stack software. To prevent such unauthorized accesses to private space from occurring with a "limited trust" applications processor, a memory bounds check can be used in the shared memory controller such that unauthorized writes can be prevented and unauthorized reads can return zeroed data. In both of these cases, an access error can be generated to allow for recovery.

In yet another embodiment, error detecting memories may also generate access errors. For example, error checks can be performed at access times. Therefore, access error response circuitry 12 can be used to respond to these access errors as well. By responding properly to these access errors, memory correction techniques may be applied, and thus ensure proper system operation. Such operation would not be possible if these access errors were ignored.

In the foregoing specification, the invention has been described with reference to specific embodiments. However, one of ordinary skill in the art appreciates that various modifications and changes can be made without departing from the scope of the present invention as set forth in the claims below. For example, the block diagrams may be different blocks than those illustrated and may have more or less blocks or be arranged differently. Also, the flow diagrams may also be arranged differently, include more or less steps, be arranged differently, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system having a processor coupled to a bus, the data processing system comprising:
   access error detection circuitry, coupled to the bus, the access error detection circuitry detecting an access error which occurs on a data or instruction access on the bus; and
   access error response circuitry, coupled to the bus, the access error response circuitry initiating replacement of an existing value on the bus with a predetermined value rather than the existing value is provided to the processor, and the access error response circuitry continuing to replace the existing value on the bus with the predetermined value when the access error has been detected and a first indicator has been asserted, wherein the predetermined value has a selectable bit-ordering, wherein the selectable bit-ordering is one of big endian and little endian, wherein the predetermined value has a first value if the current mode of the data processing system is a first one of the plurality of modes, and wherein the predetermined value has a second one of the plurality of modes, and wherein the first value and the second value are not a same value.

2. A data processing system as in claim 1, wherein the access error response circuirty stops replacing the existing value on the bus with the predetermined value when a second indicator is received.

3. A data processing system as in claim 2, wherein the second indicator indicates that an interrupt vector fetch has been initiated by the processor.

4. A data processing system as in claim 1, wherein the predetermined value is selected to be one of a plurality of values based upon which one of a plurality of modes has been selected for the data processing system.

5. A data processing system as in claim 1, wherein the predetermined value corresponds to a software interrupt instruction.

6. A data processing system as in claim 1, wherein the predetermined value corresponds to an undefined Java bytecode.

7. A data processing system as in claim 1, wherein if the access error occurs on a write access, the write access is blocked.

8. A data processing system as in claim 1, wherein if the bus transfers data and the access error occurs on a read access, then the predetermined value is a predetermined data value.

9. A data processing system as in claim 8, further comprising:
 a data cache, coupled to the processor;
 wherein the predetermined data value instead of the existing value is stored in the data cache.

10. A data processing system as in claim 8, wherein the predetermined data value is all zero.

11. A data processing system as in claim 1, further comprising:
 a cache, coupled to the processor;
 wherein the predetermined value instead of the existing value is stored in the cache.

12. A data processing system as in claim 1, wherein when the bus transfers instructions to and from the processor and the access error occurs on an instruction fetch, the predetermined value is a predetermined instruction value provided to the processor.

13. A data processing system, comprising:
 a processor;
 an instruction bus coupled to transfer instructions to and from the processor;
 a data bus coupled to transfer data to and from the processor;
 access error detection circuitry, coupled to the instruction bus and to the data bus, the access error detection circuitry detecting an access error in the data processing system; and
 access error response circuitry, coupled to the instruction bus and to the data bus, the access error response circuitry initiating replacement of an existing instruction value on the instruction bus with a predetermined instruction value when the access error has been detected wherein the predetermined instruction value rather than the existing instruction value is provided to the processor, said access error response circuitry continuing to replace the existing instruction value on the instruction bus with the predetermined instruction value when the access error response circuitry stops replacing the existing instruction value on the instruction bus with the predetermined instruction value when a second indicator is received from the processor indicative of the processor executing a software interrupt or an exception, and wherein the predetermined value has a first value if the current mode of the data processing system is a first one of the plurality of modes, and wherein the predetermined value has a second one of the plurality of modes, and wherein the first value and the second value are not a same value.

14. A data processing system as in claim 13, wherein the access error response circuitry stops replacing the existing instruction value on the instruction bus with the predetermined instruction value when a second indicator is received.

15. A data processing system as in claim 13, further comprising a data cache coupled to the processor, wherein said access error response circuitry initiates replacement of an existing data value on the data bus with a predetermined data value when the access error has been detected and the access error occurs on a read access, and wherein the predetermined data value instead of the existing data value is stored in the data cache.

16. A data processing system as in claim 13, wherein if the access error occurs on a write access, the write access is blocked.

17. A data processing system as in claim 13, wherein the predetermined instruction value is selected to be one of a plurality of values based upon which one of a plurality of modes has been selected for the data processing system.

18. A data processing system as in claim 17, wherein the predetermined instruction value corresponds to a software interrupt instruction for a first one of the plurality of modes.

19. A data processing system as in claim 17, wherein the predetermined instruction value corresponds to an undefined Java bytecode for a second one of the plurality of modes.

20. A method for responding to an access error in a data processing system, comprising:
 detecting an access error in the data processing system;
 determining which one of a plurality of modes is a current mode of the data processing system;
 replacing an existing bus value with a predetermined value when the access error is detected,
 wherein the predetermined value has a first value if the current mode of the data processing system is a first one of the plurality of modes, and wherein the predetermined value has a second value if the current mode of the data processing system is a second one of the plurality of modes, and wherein the first value and the second value are not a same value.

21. A method as in claim 20, wherein the predetermined value is used to determine a software processing routine to be executed in the data processing system.

22. A method as in claim 20, wherein the first value corresponds to a software interrupt instruction.

23. A method as in claim 20, wherein the second value corresponds to a Java bytecode.

* * * * *

UNITED STATES PATENT AND TRADEMARK OFFICE
CERTIFICATE OF CORRECTION

PATENT NO. : 7,278,062 B2  Page 1 of 1
APPLICATION NO. : 10/339022
DATED : October 2, 2007
INVENTOR(S) : William C. Moyer It is certified that error appears in the above-identified patent and that said Letters Patent is hereby corrected as shown below:

In Column 11, Line 7, Claim No. 1:

Change "wherein the selectable" to --and wherein the selectable--

In Column 11, Line 44, Claim No. 10:

Change "zero." to -- zeros--

In Column 12, Line 8, Claim No. 13:

Change "access error response circuitry stops" to --access error has been detected and a first indicator has been asserted, wherein the access error response circuitry stops--

Signed and Sealed this

Twentieth Day of May, 2008

JON W. DUDAS
*Director of the United States Patent and Trademark Office*